(12) United States Patent
Orihara et al.

(10) Patent No.: US 10,035,479 B2
(45) Date of Patent: Jul. 31, 2018

(54) STEERING APPARATUS

(71) Applicant: NSK Ltd., Shinagawa-ku, Tokyo (JP)

(72) Inventors: Daiki Orihara, Gunma (JP); Hiroshi Kakita, Gunma (JP); Osamu Kurihara, Gunma (JP); Daisuke Terasawa, Shizuoka (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 15/521,598

(22) PCT Filed: Mar. 15, 2016

(86) PCT No.: PCT/JP2016/058140
§ 371 (c)(1),
(2) Date: Apr. 24, 2017

(87) PCT Pub. No.: WO2017/158720
PCT Pub. Date: Sep. 21, 2017

(65) Prior Publication Data
US 2018/0001845 A1    Jan. 4, 2018

(51) Int. Cl.
*B60R 16/027*    (2006.01)
*B62D 1/187*    (2006.01)
(Continued)

(52) U.S. Cl.
CPC ............ *B60R 16/027* (2013.01); *B62D 1/187* (2013.01); *B62D 1/192* (2013.01); *B62D 1/184* (2013.01); *B62D 5/0421* (2013.01)

(58) Field of Classification Search
CPC ...... B60R 16/027; B62D 1/184; B62D 1/187; B62D 1/192; B62D 5/0421
See application file for complete search history.

(56) References Cited

U.S. PATENT DOCUMENTS 8,353,533 B2 * 1/2013 Aota .................... B60R 16/027
                                                  280/779
8,534,705 B2 * 9/2013 Fujiwara ............... B62D 1/195
                                                  280/775
(Continued)

FOREIGN PATENT DOCUMENTS

JP    2005022450 A  *  1/2005
JP       5874874 B1     3/2016
(Continued)

OTHER PUBLICATIONS

Written Opinion of the International Searching Authority for International Patent Application No. PCT/JP2016/058140, dated May 24, 2016.

*Primary Examiner* — Laura Freedman
(74) *Attorney, Agent, or Firm* — Shapiro, Gabor and Rosenberger, PLLC

(57) ABSTRACT

A steering apparatus (2, 202) of the invention of the present application is disclosed, which includes an electrifying plate (40, 240) secured to an inner column (11, 211) and received within a guide groove (25, 225) of an outer column (10, 210). The electrifying plate contacts an electrifying cover (15, 215) of the outer column, and configures part of an electrifying path leading to the outer column from the inner column. The invention of the present application enables a new electrifying path to be ensured, which extends from a steering wheel (101) to a car body (100).

20 Claims, 12 Drawing Sheets

(51) Int. Cl.
*B62D 1/19* (2006.01)
*B62D 1/184* (2006.01)
*B62D 5/04* (2006.01)

(56) References Cited

U.S. PATENT DOCUMENTS

| | | | | |
|---|---|---|---|---|
| 8,540,280 B2* | 9/2013 | Ishii | | B62D 1/195 |
| | | | | 280/777 |
| 8,596,683 B2* | 12/2013 | Ishii | | B62D 1/195 |
| | | | | 280/775 |
| 8,955,883 B2* | 2/2015 | Nagase | | B62D 1/18 |
| | | | | 280/775 |
| 8,985,629 B2* | 3/2015 | Hattori | | B62D 1/195 |
| | | | | 280/777 |
| 9,566,997 B2* | 2/2017 | Fujiwara | | B62D 1/195 |
| 9,586,611 B2* | 3/2017 | Sakuda | | B62D 1/184 |
| 9,637,161 B2* | 5/2017 | Orihara | | B62D 1/195 |
| 9,669,781 B2* | 6/2017 | Kakita | | B60R 16/027 |
| 9,688,222 B2* | 6/2017 | Kakita | | B62D 1/185 |
| 9,707,910 B2* | 7/2017 | Kakita | | B62D 1/19 |
| 2005/0173914 A1* | 8/2005 | Sadakata | | B62D 1/181 |
| | | | | 280/777 |
| 2007/0209864 A1* | 9/2007 | Segawa | | B62D 5/0403 |
| | | | | 180/446 |
| 2016/0167696 A1* | 6/2016 | Tanaka | | B62D 1/195 |
| | | | | 74/492 |
| 2016/0264168 A1* | 9/2016 | Kubota | | B62D 1/185 |
| 2016/0355208 A1* | 12/2016 | Orihara | | B62D 1/185 |

FOREIGN PATENT DOCUMENTS

| | | |
|---|---|---|
| JP | 2016-60297 A | 4/2016 |
| WO | WO 2004/000627 A1 | 12/2003 |
| WO | WO 2015/190300 A1 | 12/2015 |
| WO | WO 2015/190301 A1 | 12/2015 |
| WO | WO 2016/035515 A1 | 3/2016 |

* cited by examiner

STEERING APPARATUS

TECHNICAL FIELD

The present invention pertains to a steering apparatus mounted in an automobile and other equivalent vehicles, and particularly to a technology of ensuring electrifying paths for electrical equipments fitted to a steering wheel.

BACKGROUND ART

In recent years, the automobiles have widely adopted a steering apparatus configured so that a steering column constructed to include two components, i.e., an inner column and an outer column, becomes collapsible to absorb a secondary collision energy in order to relieve an impact exerted on a driver upon the secondary collision with the steering wheel in case of an accident. In this type of steering apparatus, the inner column and the outer column relatively slide on each other in an axial direction, whereby the steering wheel moves toward the front of a vehicle, and an energy absorbing means provided between the inner column and the outer column absorbs the secondary collision energy.

For example, in the steering apparatus described in Patent document 1, the outer column disposed on a lower side is secured to a car body through a tilt bracket and a tilt pivot, and a clamping mechanism clamps the outer column to thereby hold the inner column disposed on an upper side. In this steering apparatus, an ingression-enabled quantity of the inner column into the outer column is set larger than a telescopic adjustable quantity, and the inner column moves to the front side of the vehicle while resisting a clamping friction force of the clamping mechanism upon the secondary collision.

What is required of this steering apparatus is to smoothly absorb the secondary collision energy generated when a driver having a light weight collides with the steering wheel. To fulfill this requirement, it is considered to reduce a clamping force of the tilt/telescopic adjustment mechanism; however, with the clamping force being decreased, the force of holding the inner column decreases, resulting in a backlash that is easy to occur at a fitting portion between the inner column and the outer column. Such being the case, according to Patent document 1, a low friction material treatment instanced by coating is applied over an outer peripheral surface of the inner column or an inner peripheral surface of the outer column, thereby reducing the clamping friction force without decreasing the clamping force.

In a telescopic type steering apparatus, the steering shaft is generally configured to include an inner shaft and an outer shaft, which are spline-joined within the steering column in order to render a transfer of a steering torque and a telescopic adjustment compatible with each other. In this case, resin coating is often applied over one of two splines, i.e., a male spline and a female spline, for preventing emission of backlash noises due to a minute gap between the male spline and the female spline.

DOCUMENT OF PRIOR ART

Patent Document

Patent document 1: International Publication WO2004/000627

SUMMARY OF THE INVENTION

Problems to be Solved by the Invention

The steering wheel of an automobile is equipped with electrical components instanced by a horn and an airbag, and an electrifying path leading to the car body from the steering wheel needs to be ensured because of a majority of these electrical components being of a body earth type.

However, as described above, when the low friction material coating is applied over the inner peripheral surface of the outer column or the outer peripheral surface of the inner column, the coating makes difficult electrification through the electrifying path via a contact surface between the inner column and the outer column. Further, the resin coating is applied over a spline-fitted portion of the steering shaft, in which case the resin coating makes difficult the electrification through the electrifying path via the spline-fitted portion.

It is an object of the present invention, which was devised in view of the problems described above, to provide a steering apparatus configured to ensure a new electrifying path leading to a car body from a steering wheel.

Means for Solving the Problems

For solving the problems described above, the present invention provides a steering apparatus including:

a steering shaft having conductivity and transferring a steering force;

an outer column having the conductivity, including a guide groove extending in an axial direction and receiving insertion of the steering shaft on the radially inner side;

an inner column having the conductivity, being fitted in the outer column to enable a relative movement in the axial direction, and supporting the steering shaft rotatably on the radially inner side;

a guide member being received in the guide groove and fitted to the inner column;

a fixture securing the guide member to the inner column;

an electrifying cover having the conductivity and covering at least part of the guide groove from the radially outer side of the outer column; and an electrifying plate having the conductivity, being fixed to the inner column in contact with at least one of the fixture and the inner column, and having at least a portion becoming elastically deformed to contact the electrifying cover under a predetermined contact pressure.

This configuration enables a new electrifying path to be ensured, which extends from the steering wheel to a car body.

Preferably, the electrifying cover is formed separately from the outer column. This configuration enables a telescopic adjustment range to be taken long.

Preferably, the electrifying cover is formed integrally with the outer column, and the outer column has an opening penetrating the electrifying cover in the radial direction on a front side of a vehicle. This configuration eliminates a necessity for fitting a separate member like the electrifying cover to the outer column, and can reduce a number of components and make a fitting work unnecessary.

Preferably, the portion, contacting the electrifying cover, of the electrifying plate is a contact portion curved to be convexed toward the electrifying cover. A simple configuration thereby enables a contact with the electrifying cover under a predetermined contact pressure, and enables a slide without being caught by the electrifying cover.

Preferably, the contact portion is disposed on the guide member on the front side of the vehicle. A position in which the portion, on the rear side of the vehicle, of the guide member abuts on the portion, on the rear side of the vehicle, of the outer column, can be thereby set to a limit of the telescopic adjustment on the rear side of the vehicle.

Preferably, the contact portion is disposed on the guide member on the rear side of the vehicle. The telescopic adjustment range can be thereby taken long.

Preferably, the contact portion is disposed on the guide member on the front side of the vehicle, and the electrifying plate further has a second contact portion disposed on the guide member on the rear side of the vehicle and contacting the electrifying cover. The electrifying path can be thereby further ensured.

Preferably, the fixture includes a bolt, and the electrifying plate is equipped with an annulus ring receiving insertion of a screw shaft of the bolt. The simple configuration thereby enables the electrifying plate to be fixed to the inner column.

Preferably, an inner peripheral surface of the outer column or an outer peripheral surface of the inner column is coated with a low friction material. This configuration enables a reduction of a friction caused between the inner column and the outer column, and enables the inner column to move on the front side of the vehicle even by a comparatively low collision load upon a secondary collision.

Preferably, the steering shaft is configured to include an upper steering shaft disposed on the rear side of the vehicle and a lower steering shaft disposed on the front side of the vehicle by fitting the upper steering shaft and the lower steering shaft together, and resin coating is applied over the upper steering shaft or the lower steering shaft at a fitting portion thereof. Backlash noises can be thereby prevented from being caused at the fitting portion between the upper steering shaft and the lower steering shaft.

Effect of the Invention

According to the steering apparatus of the present invention, it is feasible to provide the steering apparatus configured to ensure the new electrifying path leading to the car body from the steering wheel.

MODE FOR CARRYING OUT THE INVENTION

In-depth descriptions of embodiments and partially modified examples of applying the present invention to a steering apparatus used for a rack assist electric power steering mechanism of a tilt/telescopic adjustment type (which will hereinafter be simply termed a steering mechanism), will hereinafter be made with reference to the drawings. Note that front-and-rear, right-and-left and up-and-down direction are indicated by arrow lines throughout the drawings, in which positions and directions of respective members will be explained along these definitions of the directions in conjunction with descriptions of the steering mechanism and the steering apparatus. These directions are coincident with directions of a vehicle with the steering apparatus mounted on the vehicle.

(First Embodiment)

Figure 1:
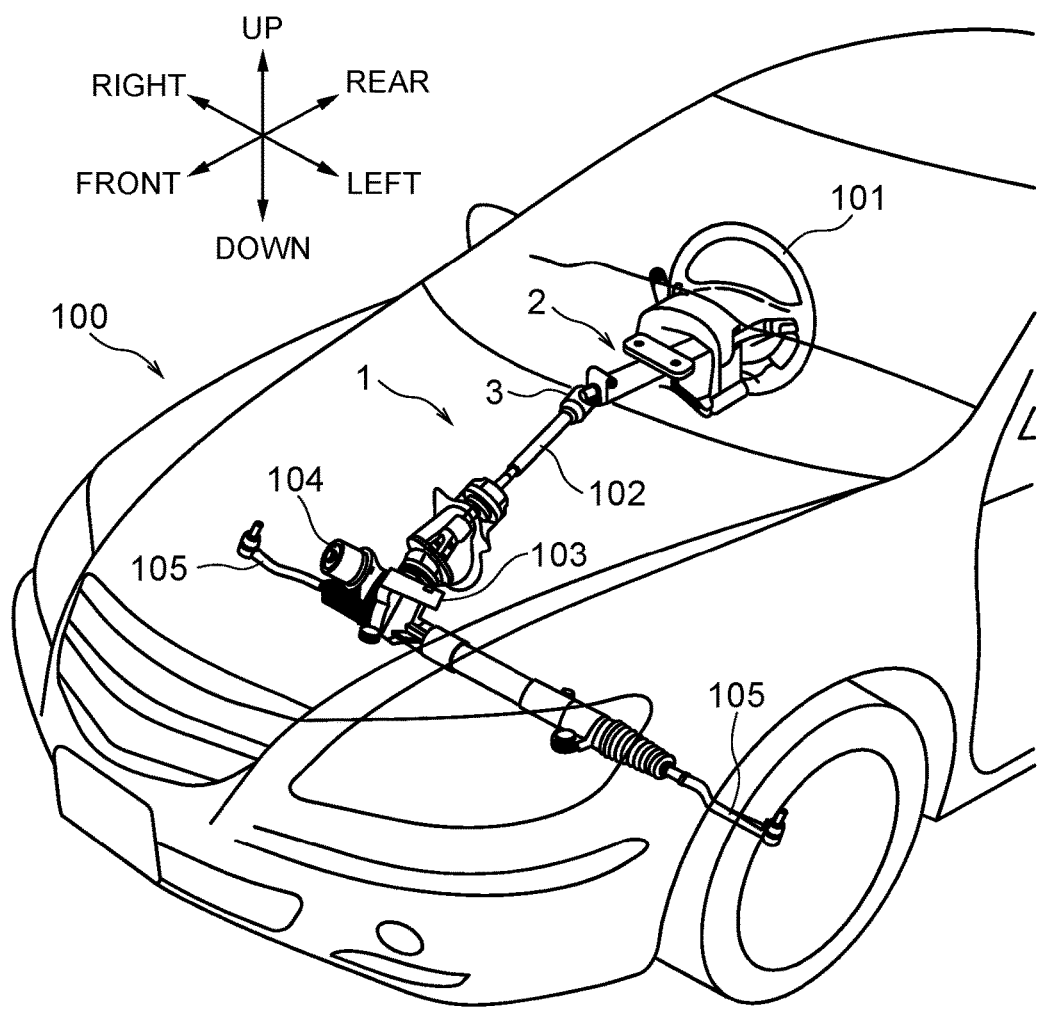
FIG. 1 is a perspective view of a steering mechanism using a steering apparatus according to a first embodiment of the present application as viewed obliquely from a left front side.

FIG. 1 is a perspective view of a steering mechanism 1 using a steering apparatus 2 according to a first embodiment as viewed obliquely from a left front side. As illustrated in FIG. 1, the steering apparatus 2 according to the first embodiment steers front wheels via right-and-left tie rods 105 connected to a rack by reciprocating the unillustrated rack right and left while causing a power-assisted mechanism 104 to assist a steering force transferred to a steering gear 103 from a steering shaft 3 axially supported on a steering column and an intermediate shaft 102 in order to reduce a force required for operating a steering wheel 101.

Figure 2:
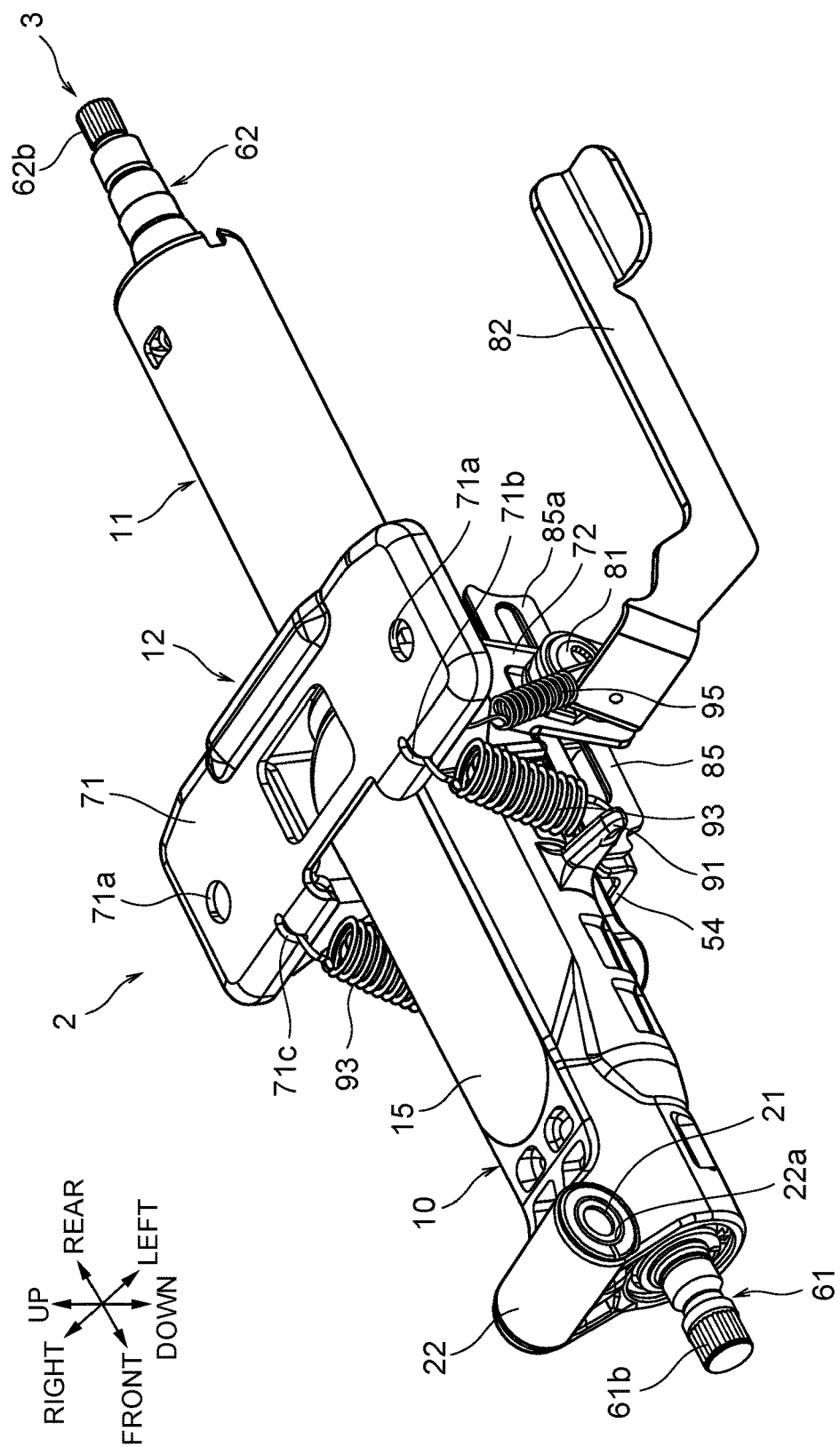
FIG. 2 is a perspective view of the steering apparatus according to the first embodiment of the present application as viewed obliquely from a left front side.

FIG. 2 is a perspective view of the steering apparatus 2 according to the first embodiment of the present application as viewed obliquely from the left front side. As illustrated in FIG. 2, the steering apparatus 2 includes, as main components, the steering shaft 3 for transferring the steering force, a cylindrical outer column 10 manufactured as an aluminum alloy die-cast molded product and building up a front portion of the steering column, an inner column 11 composed of a steel pipe and building up a rear portion of the steering column, and a tilt bracket 12 that holds the outer column 10 on a car body 100 (see FIG. 1).

The outer column 10 has an inner peripheral surface 13 (illustrated in FIG. 5) that is slightly larger than an outside diameter of the inner column 11, and a front portion of the inner column 11 is inserted into a radially inner side from a rear side of the vehicle.

The outer column 10 has a pivot boss 22 on a front end upper portion, which holds a collar 21 made of the steel pipe in a boss hole 22a penetrating in the right-and-left direction, and is rotatably fitted to the car body 100 via a pivot bolt (unillustrated) inserted into the collar 21.

An electrifying cover 15 made of a metallic material having conductivity and being elongated in the axial direction is fitted to an upper portion of the outer column 10.

Figure 3:
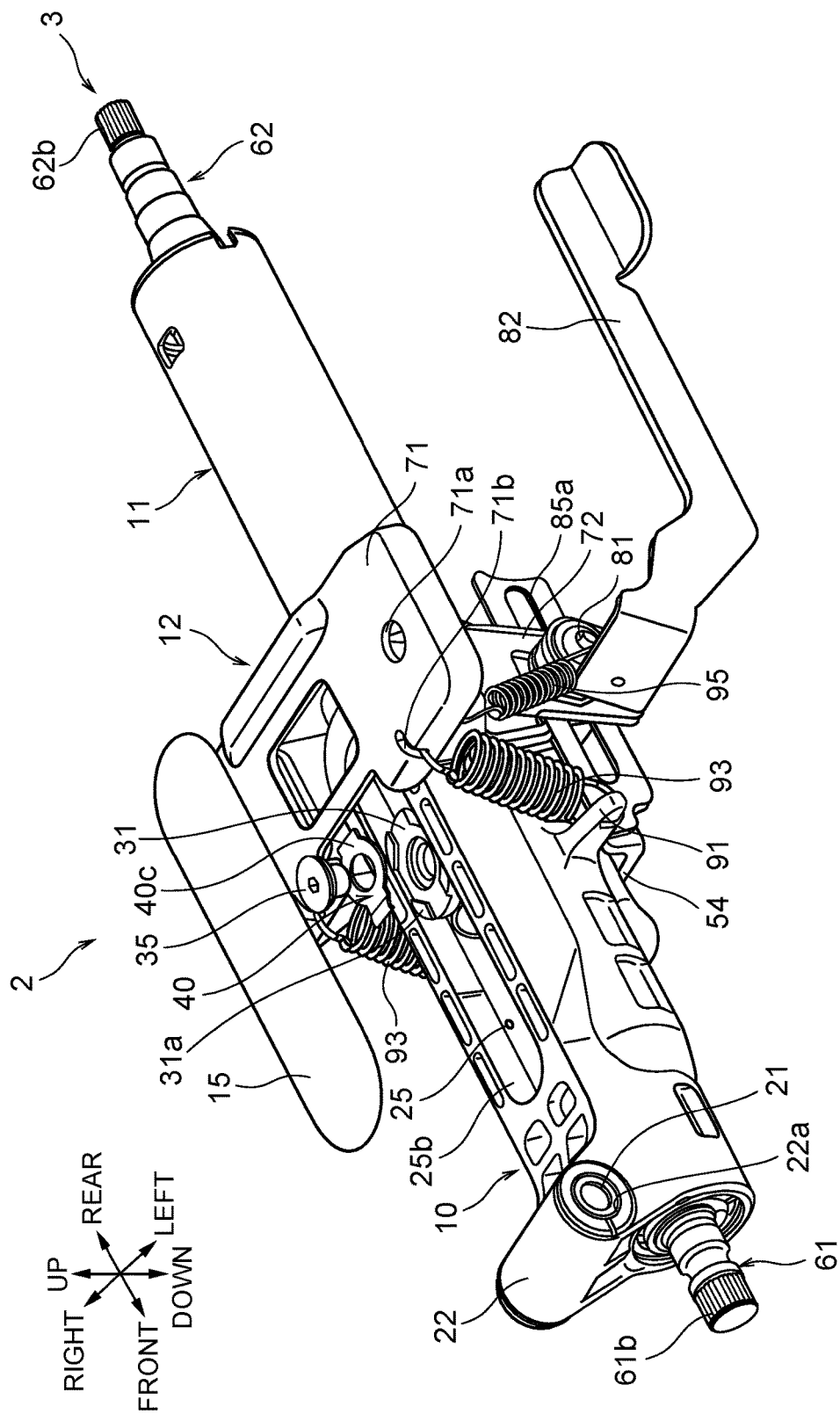
FIG. 3 is a partially exploded perspective view of the steering apparatus according to the first embodiment as viewed obliquely from a left front side.

FIG. 3 is a partially exploded perspective view of the steering apparatus 2 according to the first embodiment of the present application as viewed obliquely from the left front side. FIG. 3 illustrates a state in which the electrifying cover 15, a below-mentioned electrifying plate 40 and a below-mentioned stepped low head bolt 35 are removed.

As illustrated in FIG. 3, the electrifying cover 15 takes a thin plate-like shape being long in the axial direction, and has front-and-rear end portions formed in a circular arc shape.

A guide groove 25 penetrating in the radial direction and being long in the axial direction is formed on the underside of the electrifying cover 15, i.e., in the upper portion of the outer column 10. The guide groove 25 receives a below-mentioned upper stopper 30 for restricting a movement of the inner column 11.

FIG. 3 illustrates a guide member 31 configuring the upper stopper 30, the electrifying plate 40 removed from the upper stopper 30, and the stepped low head bolt 35 removed from the upper stopper 30. The electrifying cover 15 and the electrifying plate 40, as will be described later on, configure part of an electrifying path extending from the inner column 11 to the outer column 10.

Figure 4:
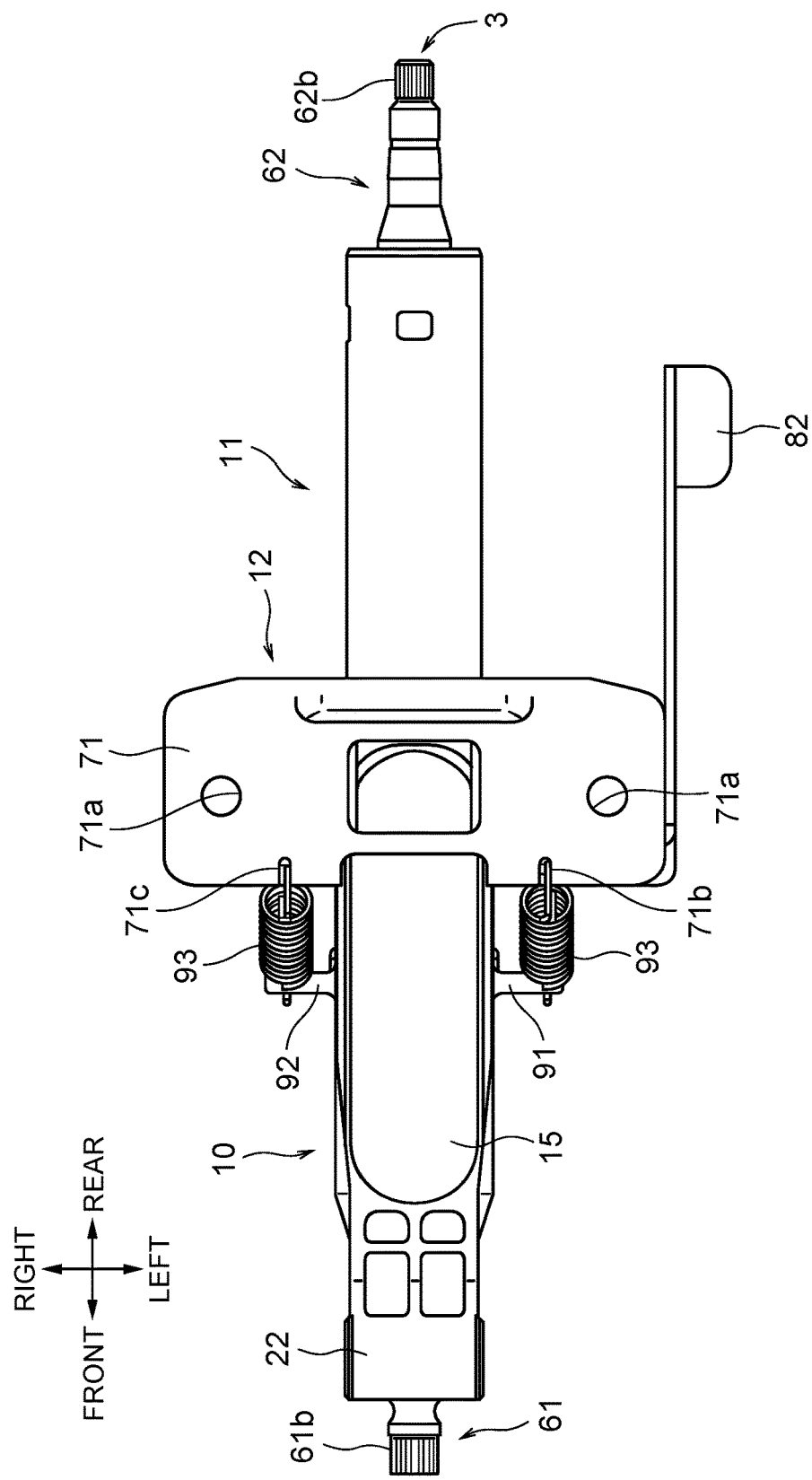
FIG. 4 is a plan view of the steering apparatus according to the first embodiment.

FIG. 4 is a plan view of the steering apparatus 2 according to the first embodiment of the present application. As illustrated in FIG. 4, the electrifying cover 15 is disposed to cover the guide groove 25 of the outer column 10. With this configuration, the electrifying cover 15, as will be described later on, not only is useful for electrification but also prevents foreign matters from entering an interior of the outer column 10 via the guide groove 25 and from thus hindering a rotation of the steering shaft 3.

(Steering Shaft)

Figure 5:
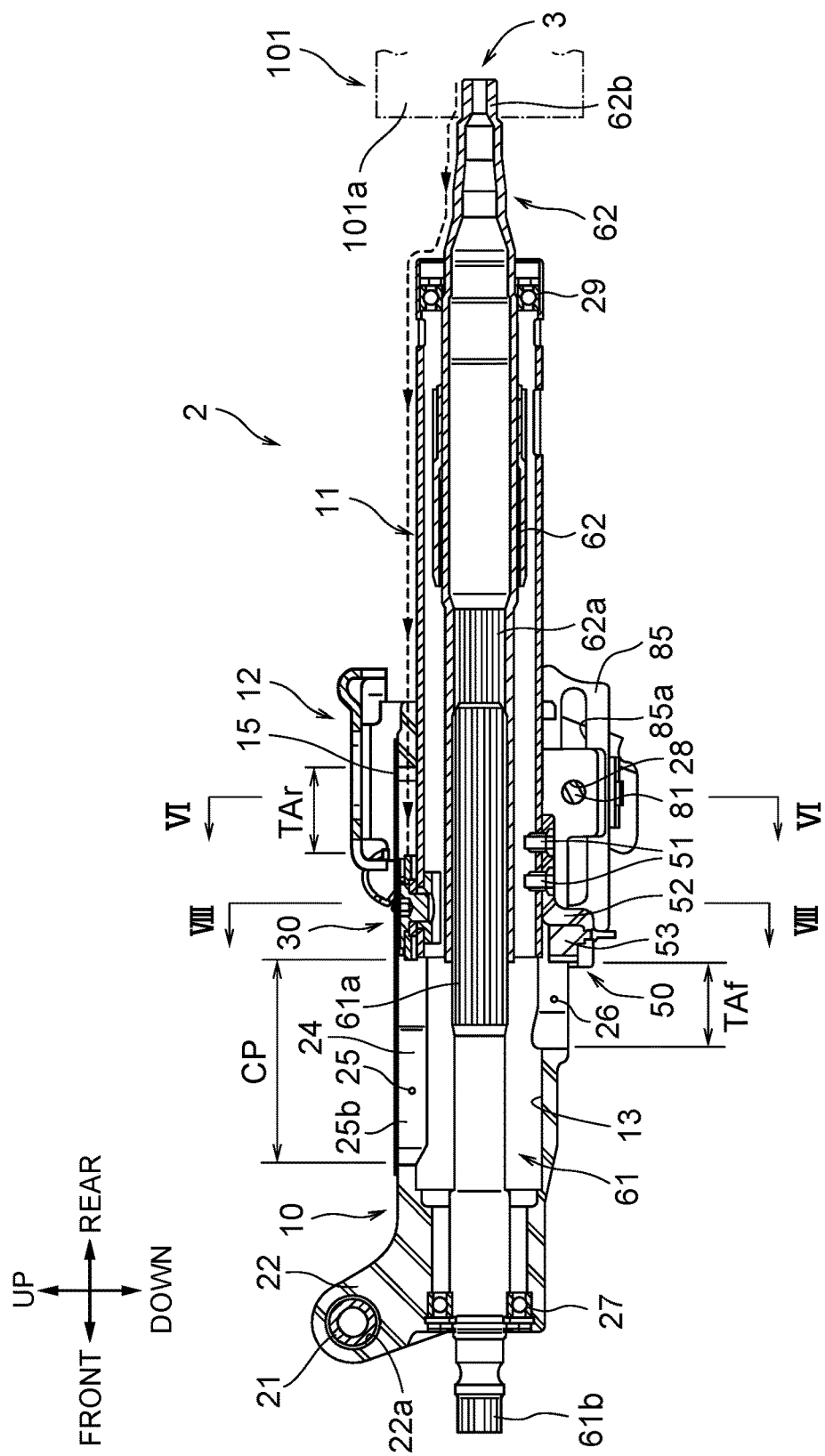
FIG. 5 is a vertical sectional view of the steering apparatus according to the first embodiment.

FIG. 5 is a vertical sectional view of the steering apparatus 2 according to the first embodiment of the present application. As depicted in FIG. 5, the steering shaft 3 is configured to include a column-shaped lower steering shaft 61 disposed on a front side of the vehicle and a cylindrical upper steering shaft 62 disposed on a rear side of the vehicle and fitted on the lower steering shaft 61.

The lower steering shaft 61 can be formed by rolling and broaching with a steel round bar used as a material, and includes a male spline 61a formed along an outer periphery of a rear half portion thereof. The lower steering shaft 61 is formed with a serration 61b, on which an unillustrated universal joint is fitted, along a circumference of a front end portion of the lower steering shaft 61. A portion, on the front side of the vehicle, of the lower steering shaft 61 is rotatably supported by ball bearings 27 fitted in the front end portion of the outer column 10.

The upper steering shaft 62 can be formed by drawing and broaching with a steel pipe as a material, and includes a female spline 62a formed along an inner periphery of a front half portion thereof and fitted on the male spline 61a of the front steering shaft 61. A serration 62b, on which a boss 101a (indicated by a one-dotted chain line in FIG. 5) of the steering wheel 101 is formed at a rear end of the upper steering shaft 62. A portion, on the rear side of the vehicle, of the upper steering shaft 62 is rotatably supported by ball bearings 29 fitted in the rear end portion of the inner column 11.

The lower steering shaft 61 and the upper steering shaft 62 are spline-joined to enable a relative movement in the axial direction while making a torque transferable. Note that resin coating is applied over the male spline 61a of the lower steering shaft 61 in order to prevent a backlash with respect to the female spline 62a of the upper steering shaft 62.

(Position Adjusting Mechanism)

The steering apparatus 2 is configured to enable a positional adjustment (which will hereinafter be called a "tilt adjustment") in a rotating direction about a pivot bolt inserted into a pivot boss 22 and a positional adjustment (which will hereinafter be called a "telescopic adjustment") in the axial direction of the inner column 11 for making adjustments to a physique and other equivalent elements of a driver when mounted on the car body 100.

Figure 6:
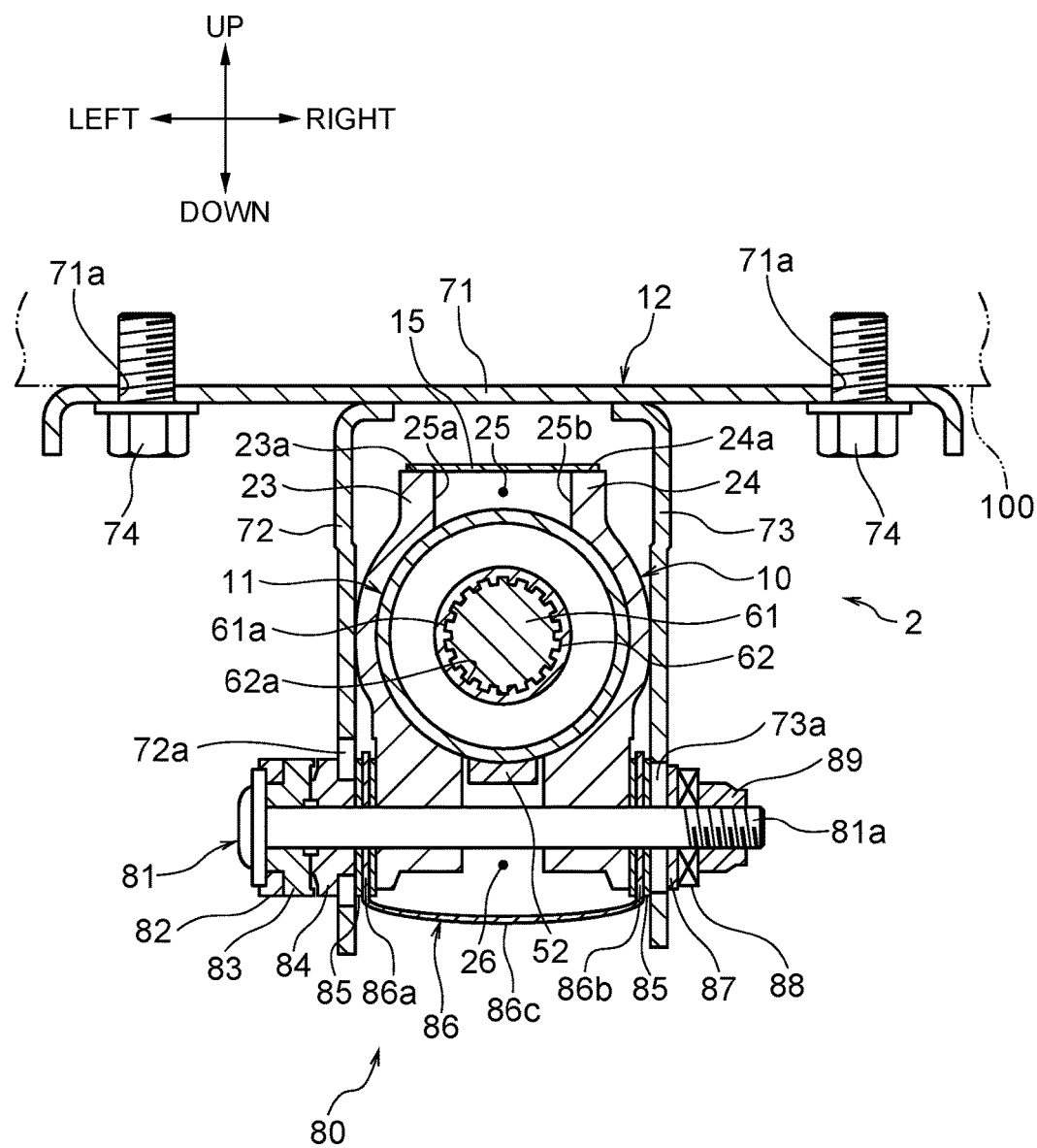
FIG. 6 is a sectional view of the steering apparatus, illustrating a cutting plane taken along the line VI-VI in FIG.

FIG. 6 is a sectional view illustrating a cutting plane taken along the line VI-VI depicted in FIG. 5. The inner column 11 is fixed in the way of clamping a portion, on the front side of the vehicle, of the inner column 11 by a portion, on the rear side of the vehicle, of the outer column 10 formed with a slit 26 extending in the front-and-rear direction of the vehicle and opened on the rear side of the vehicle. The fixation thereof is configured to be released by a driver's operation and to enable the telescopic adjustment. A portion, on the rear side of the vehicle, of the outer column 10 is pinched by the tilt bracket 12 from both of the left and right sides, and is thereby fixed. As described above, the configuration is such that simultaneously when the driver releases the fixation of the inner column 11 held by the outer column 10, the fixation in up-and-down direction by the tilt bracket 12 is also released, thereby enabling the tilt adjustment. This configuration will be described next specifically.

The tilt bracket 12 includes an upper plate 71 extending bilaterally, and a couple of left and right side plates 72, 73 welded to a lower surface of the upper plate 71 and extending downward. The upper plate 71 is fastened to the car body 100 by bolts 74 each inserted into a bolt hole 71a. An interval between the left and right side plates 72 and 73 is set slightly larger than a lateral width of the outer column 10 in a free state. The left and right side plates 72, 73 are formed with tilt adjustment elongate holes 72a, 73a through which to insert a below-mentioned clamp bolt 81. Each of the tilt adjustment elongate holes 72a, 73a is formed in a circular arc shape about the pivot boss described above, and is configured to make the clamp bolt 81 movable upon making the tilt adjustment.

A clamping mechanism 80 for fastening-fixing the outer column 10 and the inner column 11 together and releasing the fixation thereof in accordance with the driver's operation, is provided in the periphery of a lower portion of the tilt bracket 12. The clamping mechanism 80 fastens the outer column 10 and the inner column 11 together from outside of the couple of left and right side plates 72, 73 of the tilt bracket 12 by using the clamp bolt 81 inserted from leftward into the tilt adjustment elongate holes 72a, 73a and into a through-hole 28 penetrating bilaterally the lower portion, on the rear side of the vehicle, of the outer column 10, and using a below-mentioned cam mechanism.

As illustrated in FIG. 6, an operation lever 82 (see FIGS. 2, 3 and 4), a movable cam 83 and a fixed cam 84 are fitted, sequentially from a bolt head side, on the clamp bolt 81 between its bolt head and a left side plate 72 of the tilt bracket 12, in which the operation lever 82 is rotationally operated by the driver, the movable cam 83 rotates integrally with the operation lever 82, and a right portion of the fixed cam 84 engages in a rotation-disabled manner with the tilt adjustment elongate hole 72a. Inclined cam surfaces taking complementary shapes are formed on respective face-to-face end surfaces of the fixed cam 84 and the movable cam 83.

When the driver rotates the operation lever 82 on the clamping side, a ridge of the inclined cam surface of the movable cam 83 runs up onto a ridge of the inclined cam surface of the fixed cam 84, thereby pulling the clamp bolt 81 leftward on one hand and pressing the fixed cam 84 rightward on the other hand. This action causes the couple of left and right side plates 72, 73 to clamp a lower portion of the outer column 10 from the bilateral sides to thereby restrict the steering column from moving in a tilt direction, and simultaneously the inner column 11 is restricted from moving in the axial direction by a clamping friction force generated for the outer column 10 to clamp the inner column 11 and by a friction force generated on the friction plate 85.

Whereas when the drivers rotates the operation lever 82 in the declamping direction, each of the couple of left and right side plates 72, 73, of which an interval in the free state is larger than the width of the outer column 10 as described above, resiliently returns. This action cancels both of the restriction on the tilt-directional movement of the outer column 10 and the restriction on the axis-directional movement of the inner column 11, thereby enabling the driver to adjust the position of the steering wheel 101.

A pressing plate 87 and a thrust bearing 88 are fitted on a tip side portion, protruding outwardly of the right side plate 73, of the clamp bolt 81. The clamp bolt 81 has a male screw 81a formed on a periphery of the tip portion thereof, and a nut 89 is screwed along this male screw 81a.

Recess portions separated from the side plates 72, 73 are formed on parts of the outer column 10 in a face-to-face relationship with the couple of left and right side plates 72, 73 of the tilt bracket 12 around the clamp bolt 81. Disposed in the recess portions are two friction plates 85 each for left and right side fixed to the inner column 11 by a below-mentioned lower stopper 50 and left and right end plates 86a, 86b configuring end portions of an intermediate friction plate 86 and being pinched by the friction plates 85 on the left and right side, respectively. The friction plates 85 and the intermediate friction plate 86 enlarge friction surfaces that produce friction forces resisting a force to move the inner column 11 upon this force being applied when fixing the inner column 11, thereby reinforcing a strength of how much the outer column 10 holds the inner column 11.

As illustrated in FIG. 5, each friction plate 85 extends in the front-and-rear direction and has an elongate hole 85a being long in the front-and-rear direction through which to insert the clamp bolt 81. This configuration enables the telescopic adjustment by permitting a relative movement between the clamp bolt 81 and the friction plate 85 upon declamping the clamp by the clamping mechanism 80.

The intermediate friction plate 86 takes such a shape that a couple of left and right endplates 86a, 86b, which are a couple of square plate members mutually facing each other and formed with round holes at their centers to permit an insertion of the clamp bolt 81, are connected by a connection plate 86c.

As depicted in FIG. 4, hook portions 91, 92 protruding bilaterally in a horizontal direction are provided in axial intermediate portions of the right and left side surfaces of the outer column 10. Engaging holes 71b, 71c are bored on left and right sides of front side portion of the upper plate 71 of the tilt bracket 12, respectively. Coil springs 93 are bridged over between the hook portions 91, 92 and the engaging holes 71b, 71c, respectively. The coil spring 93 lightens the driver's operation for the tilt adjustment by sharing weights of the steering column and steering wheel 101 etc. when making the tilt adjustment.

As illustrated in FIGS. 2 and 3, a coil spring 95 is bridged also between the operation lever 82 and the tilt bracket 12. The coil spring 95 gives a preload so as not to cause the backlash between the fixed cam 84 and the movable cam 83 when releasing the operation lever 82.

The lower stopper 50 for fixing the friction plates 85 to the inner column 11 is fitted to the lower surface, on the front side, of the inner column 11 and is received within the slit 26. The frictional plates 85 each engage with an engaging arm 54 protruding outside of the slit 26 from both of left and right side surfaces of the lower stopper 50.

A buffer retaining portion 52 taking substantially L-shape in section is formed protrusively downward at the front end of the lower stopper 50, and a buffer block 53 is fitted to a front side of this buffer retaining portion 52. When making the telescopic adjustment, the buffer block 53 abuts on a portion, on the front side of the slit 26, of the outer column 10, thereby regulating a forward telescopic adjustment range (indicated by a symbol TAf in FIG. 5) of the inner column 11. The buffer block 53 made from a rubber buffers an impact not to damage resin pins 51 even upon colliding with the portion, on the front side of the vehicle, of the outer column 10 formed with the slit 26 when making the telescopic adjustment.

(Impact Absorption Mechanism)

A resin having a low friction coefficient is coated over an outer peripheral surface of a portion, which is inserted into the outer column 10, of the inner column 11. This resin coating keeps comparatively low a clamping friction force produced by clamping the inner column 11 from the outer column 10 even when setting large the clamping force by which the clamping mechanism 80 clamps the outer column 10.

The lower stopper 50 is fitted to the inner column 11 by a couple of front and rear resin pins 51. The inner column 11 moves forward upon a secondary collision, in which case the buffer block 53 attached to the lower stopper 50 collides with the portion, on the front side of the slit 26, of the outer column 10. When an impact caused by this collision is larger than a predetermined magnitude, the resin pins 51 are fractured by shearing, with the result that the inner column 11 is separated from the lower stopper 50 and is thereby enabled to move further forward without receiving any restriction of the movement by the friction plates 85.

With this configuration, even when the driver having a light weight secondarily collides with the steering wheel 101 upon the collision of the automobile, the steering wheel 101 together with the inner column 11 moves forward relatively easily, thus relieving the impact of the secondary collision. The coating of the resin having the low frictional coefficient can keep the low clamp friction force even when decreasing a working accuracy of an inner peripheral surface 13 of the outer column 10, and therefore a working cost can be also reduced.

(Upper Stopper)

Figure 7:
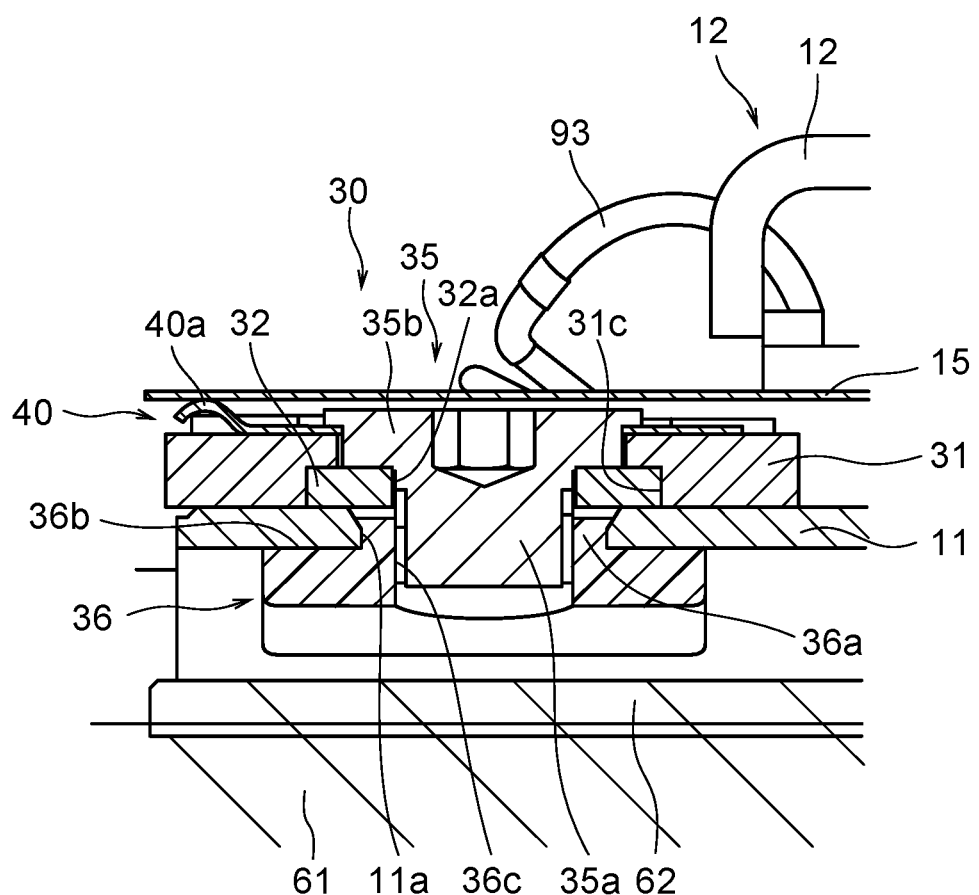
FIG. 7 is an expanded sectional view of a periphery of an upper stopper of the steering apparatus according to the first embodiment.
Figure 8:
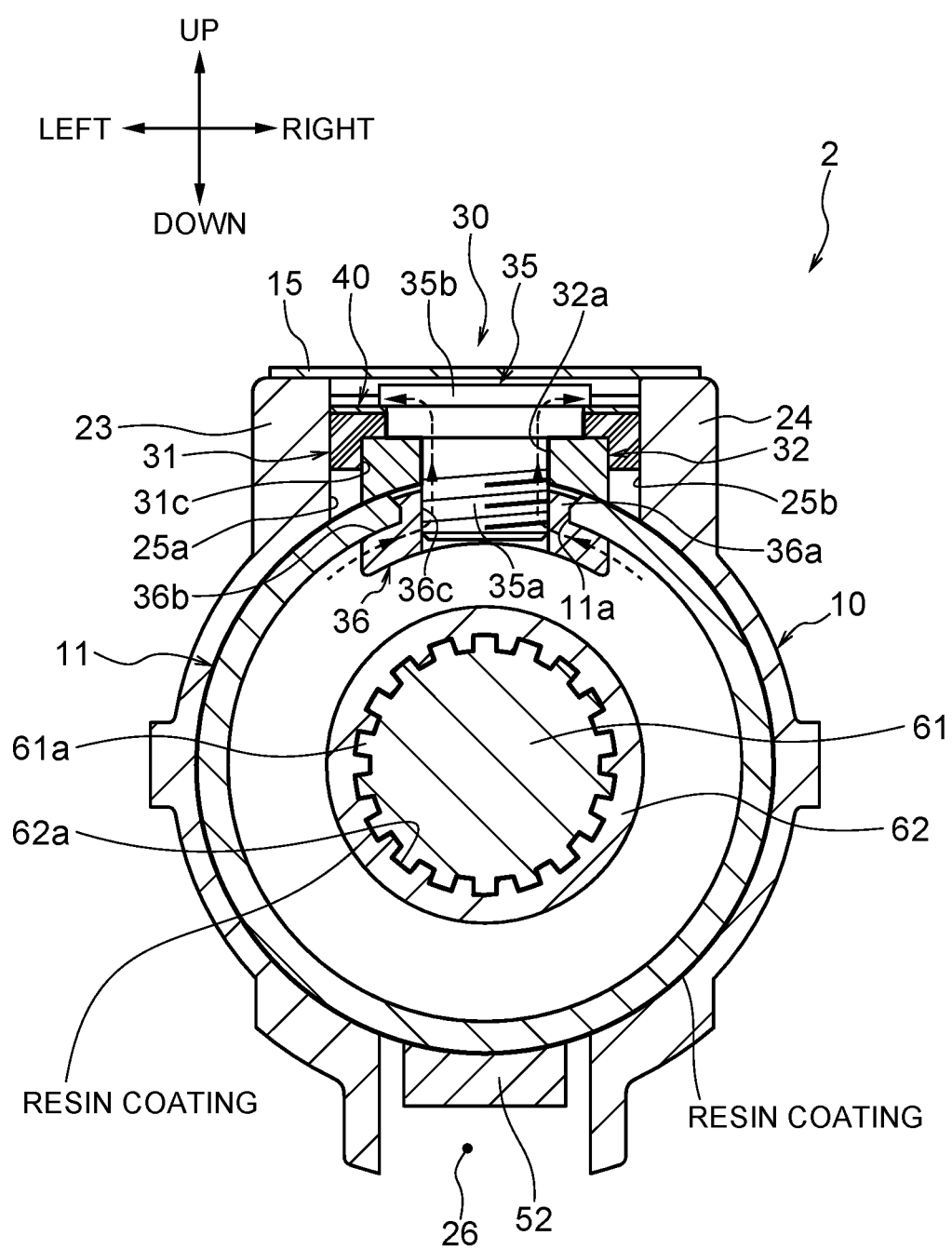
FIG. 8 is a sectional view illustrating a cutting plane taken along the line VIII-VIII in FIG. 5.

FIG. 7 is an enlarged sectional view of a periphery of the upper stopper 30 illustrated in FIG. 5. FIG. 8 is a sectional view illustrating a cutting plane taken along the line VIII-VIII depicted in FIG. 5.

As illustrated in FIGS. 5 and 8, a couple of left and right guide walls 23, 24 protruding upward and extending in the front and rear direction are formed on the upper portion of the outer column 10, and a guide groove 25 penetrating in the radial direction and extending in the front and rear direction is provided between these guide walls. The upper stopper 30, with its height being set lower than the guide walls 23, 24, is fixed to the inner column 11 and is received inwardly of the guide groove 25.

The upper stopper 30 engages with the guide groove 25, thereby preventing a relative rotation of the inner column 11 with respect to the outer column 10 and regulating an axis-directional relative movement range of the inner column 11 and the outer column 10. In other words, the upper stopper 30 regulates a backward telescopic adjustment range (indicated by a symbol TAr in FIG. 5) of the inner column 11 by abutting on the portion, on the rear side of the vehicle, of the outer column 10 formed with the guide groove 25, and also regulates a movement range (indicated by a symbol CP in FIG. 5) of the inner column 11 upon the secondary collision by abutting on the portion, on the front side of the vehicle, of the outer column 10 formed with the guide groove 25.

The upper stopper 30 includes a guide member 31 as a resinous injection-molded product and a metallic stopper base 32, the configuration being such that the guide member 31 and the stopper base 32 are fitted to the inner column 11 by fixtures, i.e., a stepped low head bolt 35 with a hexagon socket and a nut plate 36 secured to the inner column 11.

The guide member 31 takes a substantially elongate circular shape as viewed on the plane and has its side surface portions, of which left and right side surfaces are disposed in the face-to-face relationship with inner surfaces 25a, 25b of the guide walls 23, 24. A lower portion of the guide member 31 is formed with a recessed portion 31c into which a stopper base 32 is fitted as illustrated in FIGS. 7 and 8. The guide member 31 can be composed of a synthetic resin and a rubber.

As illustrated in FIGS. 7 and 8, the stopper base 32 is bored at the center with a through-hole 32a into which the screw shaft 35a of the stepped low head bolt 35 is inserted. The stopper base 32 has its lower surface formed in a shape of curved surface having substantially the same curvature as a curvature of the outer peripheral surface of the inner column 11 and is, as illustrated in FIG. 8, kept in a surface-contact with the inner column 11.

The nut plate 36 has, as depicted in FIG. 7, a boss 36a, at the center of an upper surface 36b, inserted into a radius-directional through-hole 11a formed in the inner column 11, and is formed with a screw hole 36c penetrating the boss 36a from an upper end surface to a lower end. The nut plate 36 including the upper surface 36b formed as a curved surface having substantially the same curvature as a curvature of the inner column 11, and is, as illustrated in FIG. 8, kept in the surface-contact with the inner peripheral surface, not coated with a low frictional material, of the inner column 11. According to the first embodiment, after securing the stopper base 32 to the inner column 11 by caulking the boss 36a in a state of being inserted into the through-hole 11a, a thread groove of the screw hole 36c is formed by using a tap. Note that another available configuration is such that the upper stopper 30 is fastened to the inner column 11 by a blind rivet in place of the nut plate 36, and the stepped low head bolt 35 is also fastened to the inner column 11 by threading the through-hole 11a of the inner column 11.

(Electrifying Path)

The first embodiment ensures an electrifying path extending from the steering wheel 101 to the car body 100 via the upper steering shaft 62, the ball bearings 29, the inner column 11, the nut plate 36, the stepped low head bolt 35, the electrifying plate 40, the electrifying cover 15, the outer column 10 and the tilt bracket 12.

Of the electrifying path, each of the upper steering shaft 62, the ball bearings 29 and the inner column 11 is made of a metallic material having a predetermined electric conductivity, and these components are brought into contact with each other and are thereby ensure the electrifying path indicated by an arrow depicted by a broken line in FIG. 5. The outer column 10 and the tilt bracket 12 are also made of a metallic material having a predetermined electric conductivity and are brought into contact with each other to be configured to enable the electrification. The electrifying path extending from the inner column 11 to the outer column 10 will hereinafter be described.

As illustrated in FIGS. 7 and 8, the upper stopper 30 is equipped with the electrifying plate 40 made of a plate-like metallic material having the predetermined electric conductivity. The electrifying plate 40, as illustrated in FIG. 3, has an annulus ring 40c through which the stepped low head bolt 35 is inserted, and is fixed by being pinched between the guide member 31 and an upper stepped portion 35b of the stepped low head bolt 35 as depicted in FIGS. 7 and 8. The electrifying plate 40 has, as illustrated in FIG. 3, protruded portions protruding in the front and rear direction from the annulus ring 40c and engaging with four pieces of engagement protrusions 31a protrusively provided on an upper surface of the guide member 31, and is thereby positioned and prevented from rotating. The electrifying plate 40 can be manufactured as a punching press molded product of a spring steel plate having elasticity, and may also involve using a material instanced by a phosphor bronze plate other than the spring steel plate, of which the electrifying plate 40 is made.

A contact portion 40a rising upward obliquely and being curved to be convexed upward is, as illustrated in FIG. 7, formed on the front sided protruded portion of the electrifying plate 40. The contact portion 40a becomes elastically deformed and is brought into contact with the electrifying cover 15 under a predetermined pressure (contact pressure). The configuration being thus made, the inner column 11 moves in the front and rear direction by the telescopic adjustment, in which case the contact portion 40a can be invariably kept in contact with the electrifying cover 15 in a way that follows up slight ruggedness of the electrifying cover 15 and a slight rotation of the inner column 11. The part, kept in contact with the electrifying cover 15, of the contact portion 40a is curved, whereby the electrifying cover 15 can be prevented from being caught by the contact portion 40a.

With the configuration described above, as indicated by an arrow depicted by a broken line in FIG. 8, the continuous electrifying path is configured by the inner column 11, the nut plate 36, the stepped low head bolt 35, the electrifying plate 40 and the electrifying cover 15 in this sequence. The electrifying cover 15 can be fixed to the outer column 10 by caulking. The electrifying path extending from the inner column 11 to the outer column 10 can be thereby ensured. Note that the fixation of the electrifying plate 40 can involve adopting a variety of fixing methods instanced by, in addition to caulking, press-fitting, screw-fixing, bolt-fixing, brazing, soldering, rivet and bonding.

(Second Embodiment)

Next, a second embodiment of the present application will be described with reference to FIGS. 9 through 12. A steering apparatus according to the second embodiment is configured partially in the same way as the steering apparatus according to the first embodiment. Accordingly, the following discussion properly omits the explanations overlapped with the discussion on the first embodiment. The components of the steering apparatus, which correspond to the components of the steering apparatus in the first embodiment, are marked with reference numerals given by adding 200 to the reference numerals used in the first embodiment. For example, a steering shaft, corresponding to the steering shaft 3 of the first embodiment, of the second embodiment is marked with a reference numeral "203".

Figure 9:
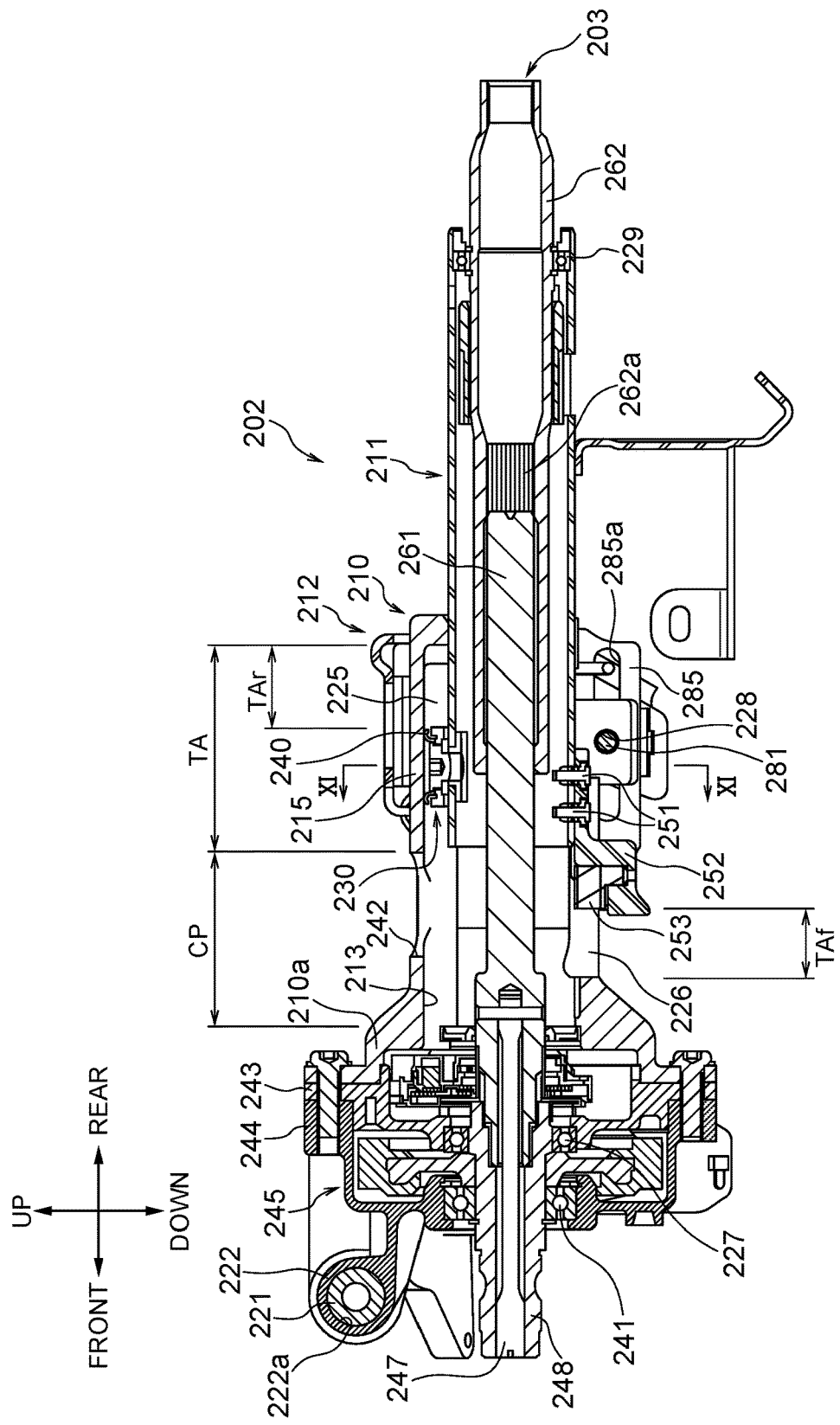
FIG. 9 is a vertical sectional view of the steering apparatus according to a second embodiment.

FIG. 9 is a vertical sectional view illustrating of a steering apparatus according to the second embodiment. The second embodiment is different from the first embodiment in terms of such a point that a steering apparatus 202 according to the second embodiment is an Electric Power Steering apparatus (EPS) equipped with a steering assist mechanism 245 for assisting the rotation of the steering shaft 203.

An end portion, on the front side of the vehicle, of an outer column 210 is formed with a diameter-enlarged portion 210a with its diameter being enlarged outward in the radial direction. A first housing 243 is fixed to the diameter-enlarged portion 210a on the front side of the vehicle, in which the first housing 243 taking substantially an annulus ring shape houses a portion, on the rear side of the vehicle, of the steering assist mechanism 245 together with the diameter-enlarged portion 210a. A second housing 244 is fixed to the first housing 243 on the front side of the vehicle, in which the second housing 244 taking substantially the annulus ring shape houses a portion, on the front side of the vehicle, of the steering assist mechanism 245 between the first housing 243 and the second housing itself.

A ball bearing 227 is fitted in an internal portion of the first housing 243 in the radial direction. A ball bearing 241 is fitted in an internal portion of the second housing 244 in the radial direction. The ball bearing 227 and the ball bearing 241 rotatably support an output shaft 248 connected via a torsion bar 247 to a lower shaft 261 on the front side of the vehicle.

The second housing 244 has a pivot boss 222 formed protrusively on the front side of the vehicle. The pivot boss 222 is used for securing the steering apparatus 202 to the car body in the tilt adjustable manner.

A guide groove 225 extending in the axial direction is formed in an upper portion of the outer column 210. The guide groove 225, which is different from the guide groove 25 in the first embodiment, is partially covered by an electrifying cover 215 formed integrally with the outer column 210. An electrifying plate 240 fitted to an upper stopper 230 contacts the electrifying cover 215.

Figure 10:
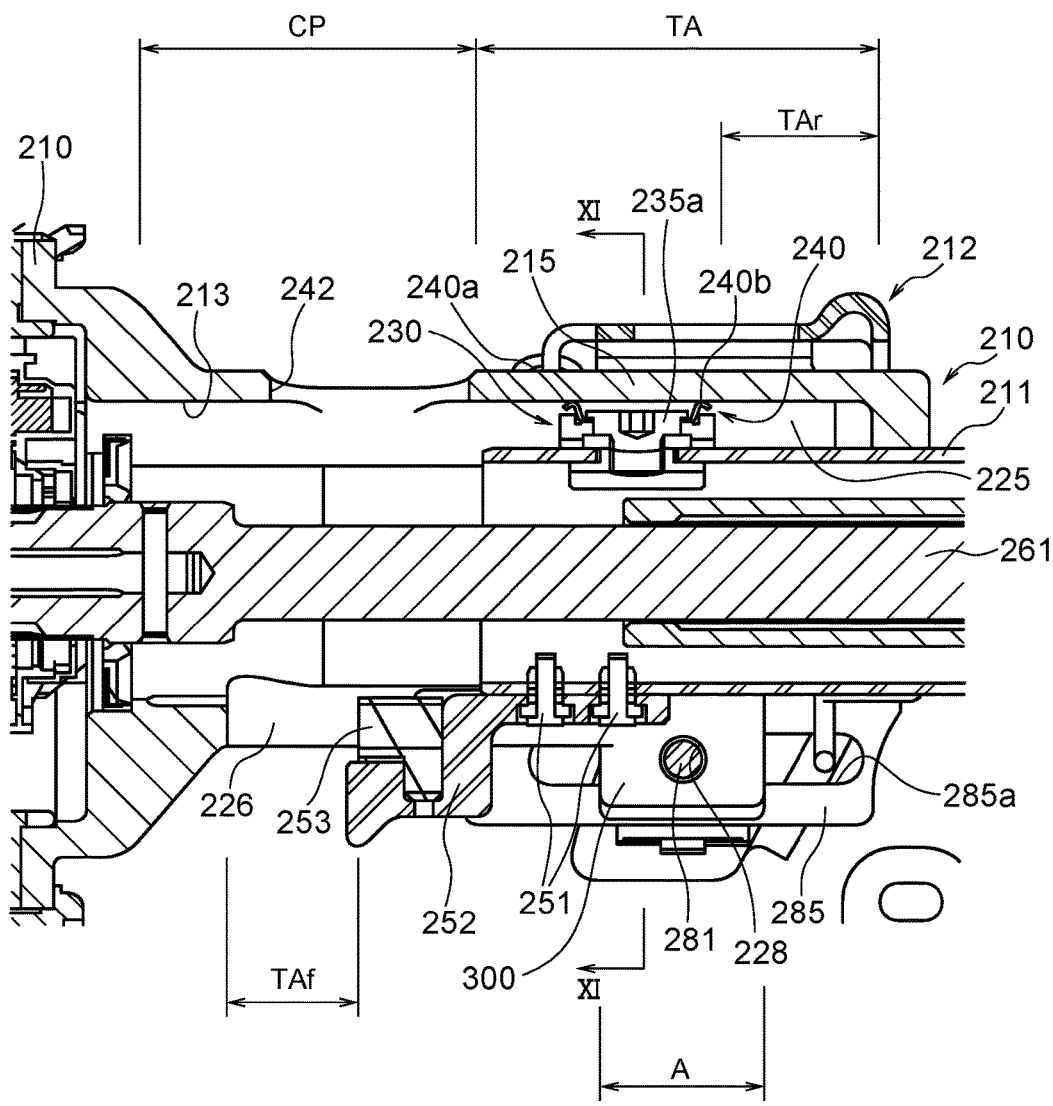
FIG. 10 is a partially enlarged of the vertical section depicted in FIG. 9.

FIG. 10 is a partially enlarged view of the vertical section illustrated in FIG. 9. FIG. 10 illustrates an enlarged section within an axis-directional movable range of the upper stopper 230.

The outer column 210 is formed with an opening 242 penetrating the electrifying cover 215 in the radial direction at a portion, on the front side of the vehicle, of the outer column 210. The opening 242 is used for fitting the upper stopper 230 and the electrifying plate 240 to the inner column 11 with the inner column 11 moved to the front side of the vehicle.

The electrifying plate 240 contacts the electrifying cover 215 at two points, i.e., a contact portion 240a formed on the front side of the vehicle and a contact portion (second contact portion) 240b formed on the rear side of the vehicle. Each of the contact portions 240a, 240b rises toward the electrifying cover 215 and is curved to be convexed on the side of the electrifying cover 215. Each of the contact portions 240a, 240b becomes elastically deformed and thus contacts the electrifying cover 215 under a predetermined contact pressure.

The electrifying plate 240 contacts the electrifying cover 215 at, at least, the second contact portion 240b even when moving up to an adjustment end on the front side of the vehicle in the telescopic adjustment range TAf toward the front of the vehicle. Accordingly, the opening 242 is disposed to be positioned closer to the front side of the vehicle than the second contact portion 240b of the electrifying plate 240 when the steering apparatus 202 is adjusted closest to the front side of the vehicle within the telescopic adjustment range TAf. A new electrifying path extending from an inner column 211 to the outer column 210 can be thereby ensured over the whole telescopic adjustment range TA.

In the second embodiment, the electrifying cover 215 formed integrally with the outer column 210 exists in at least an axis-directional range (indicated by a reference symbol "A" in FIG. 10) of a clamping portion (indicated by a reference numeral 300 in FIG. 10) of the outer column 210. Existence of the electrifying cover 215 in the range described above enables a clamp portion 300 of the outer column 210 to ensure its rigidity in a peripheral direction, and causes a reactive force against clamping without an excessive flexure of the clamp portion 300 of the outer column 210 even when the clamp mechanism clamps the clamp portion 300 of the outer column 210 through a couple of left and right side plates 272, 273 of a tilt bracket 212. It is therefore feasible to produce the clamping force between the clamp portion 300 of the outer column 210 and the fixed cam and between the clamp portion 300 of the outer column 210 and the nut (refer to the nut 89 in FIG. 6), and to produce the sufficient frictional force between each of the side plates 272, 273, a friction plate 285 and an intermediate friction plate (refer to the intermediate friction plate 86 in FIG. 6) each existing between the clamp portion 300 of the outer column 210 and the fixed cam and between the clamp portion 300 of the outer column 210 and the nut, and each of counter-members. This configuration enables the steering apparatus 202 to reinforce a tilt holding force and a telescopic holding force thereof.

In the second embodiment, a torque generated by twisting the steering shaft 203 with a key lock bar ejected, is transferred to the outer column 210 via the inner column 211 and the upper stopper 230. In the second embodiment, the electrifying cover 215 is formed integrally with the outer column 210 outward in the radial direction in the movement range of the upper stopper 230 within the telescopic adjustment range, thereby ensuring a strength against the torque due to an enhanced strength of the outer column 210.

Figure 11:
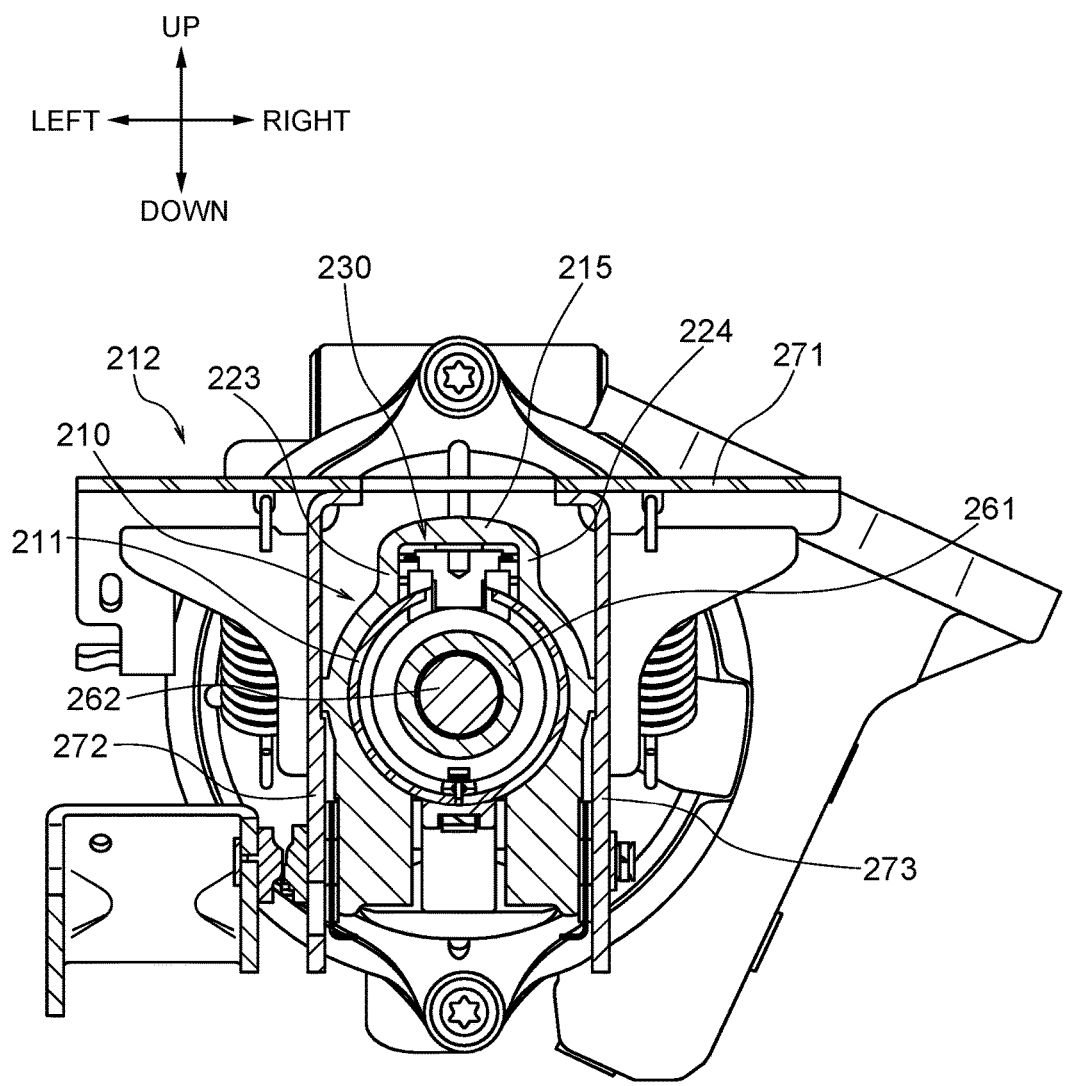
FIG. 11 is a sectional view illustrating a cutting plane taken along the line XI-XI depicted in FIGS. 9 and 10.

FIG. 11 is a sectional view illustrating the cutting plane taken along the line XI-XI depicted in FIGS. 9 and 10. FIG. 11 illustrates the section being cut vertically to the axial direction of the steering apparatus 202 in a position of the upper stopper 230.

The electrifying cover 215 rises from the upper portion of the outer column 210 and is formed integrally with left and right guide walls 223, 224 extending in the axial direction. A lower surface of the electrifying cover 215, i.e., the surface, on the side of the inner column 211, of the electrifying cover 215 is formed flat. An upper surface of the electrifying cover 215, i.e., the surface, on the opposite side to the inner column 211, of the electrifying cover 215 takes a curved shape to be convexed upward as viewed in the axial direction.

Figure 12:
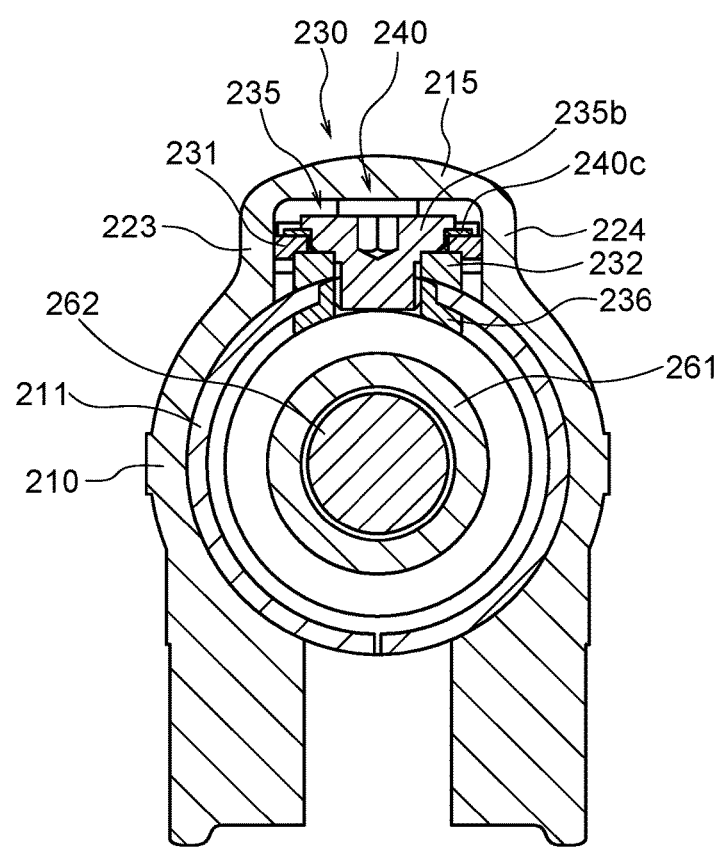
FIG. 12 is a partially enlarged view of the section depicted in FIG. 11.

FIG. 12 is a partially enlarged view of FIG. 11. FIG. 12 shows enlarged illustrations of the outer column 210 and members disposed inside in the radial direction, while omitting the illustrations of the members peripheral to the outer column 210.

Similarly to the first embodiment, the electrifying plate 240 has an annulus ring 240c receiving insertion of a stepped low head bolt 235, and is fixed by being pinched between an upper stepped portion 235b of the stepped low head bolt 235 and a guide member 231.

Similarly to the first embodiment, the second embodiment discussed above enables a new electrifying path to be ensured, which leads to the car body from the steering wheel.

Note that the specific embodiments given above have been described to facilitate the understanding of the present invention, but do not limit the present invention.

For example, the electrifying path of the first embodiment is a path when the present invention is applied to the rack assist type electric power steering apparatus, and, however, the present invention is, as a matter of course applicable also to a column assist type electric power steering apparatus as in the second embodiment. Conversely to this configuration, the electrifying path according to the second embodiment can be also applied to the rack assist type electric power steering apparatus.

The specific configurations of the steering column, the tilt/telescopic adjustment mechanism and the upper stoppers 30, 230 can be also properly modified within the scope that does not deviate from the gist of the present invention.

For example, the electrifying plates 40, 240 may take, without being limited to the shapes in the embodiments discussed above, any shapes as far as permitting the contact with the electrifying covers 15, 215 through the elastic deformation under the predetermined pressure (contact pressure). For instance, there is no necessity for setting the number of the contact portions 40a, 240a, 240b to "1" or "2" as in the embodiments described above, three or more contact portions 40a, 240a, 240b may be formed, and may each take, without being limited to the shapes according to the embodiments described above, a semi-spherical shape protruding toward the electrifying covers 15, 215 in place of the shape curved to be convexed on the side of the electrifying covers 15, 215. Pluralities of contact portions 40a, 240a, 240b may also be formed separately in the peripheral direction to thereby further ensure the electrifying path. The contact portions 40a, 240a, 240b may also be disposed only on the rear side of the vehicle with respect to the guide members 31, 231.

It may be sufficient that the electrifying plates 40, 240 are disposed to enable the electrifying paths to be ensured, which extend from the inner columns 11, 211 to the electrifying covers 15, 215, and are also disposed in direct contact with the inner columns 11, 211. In this case, the fixtures for securing the guide members 31, 231 to the inner columns 11, 211 have no necessity for having the conductivity.

DESCRIPTION OF REFERENCE NUMERALS AND SYMBOLS 1 steering mechanism
2, 202 steering apparatus
3, 203 steering shaft
10, 210 outer column
210a diameter-enlarged portion
11, 211 inner column
11a through-hole
12, 212 tilt bracket
13, 213 inner peripheral surface
15, 215 electrifying cover
21 collar
22, 222 pivot boss
22a, 222a boss hole
23, 24, 223, 224 guide wall
25, 225 guide groove
25a, 25b inner surface
26 slit
27, 227 ball bearing
28, 228 through-hole
29, 229 ball bearing
30, 230 upper stopper
31, 231 guide member
31a engagement protrusion
32, 232 stopper base
32a through-hole
35, 235 stepped low head bolt
35a screw shaft
35b, 235b upper stepped portion
36, 236 nut plate
36a boss
36b upper surface
36c screw hole
40, 240 electrifying plate
40a, 240a, 240b contact portion
40c, 240c annulus ring
241 ball bearing
242 opening
243 first housing
244 second housing
245 steering assist mechanism
247 torsion bar
248 output shaft
50 lower stopper
51, 251 resin pin
52, 252 buffer retaining portion
53, 253 buffer block
54 engagement arm
61, 261 lower steering shaft
61a male spline
61b serration
62, 262 upper steering shaft
62a, 262a female spline
71, 271 upper plate
71a bolt hole
71b, 71c engagement hole
72, 272 left side plate
72a tilt adjustment elongate hole
73, 273 right side plate
73a tilt adjustment elongate hole
80 clamp mechanism
81 clamp bolt
81a male screw
82 operation lever
83 movable cam
84 fixed cam
85, 285 friction plate
85a, 285a elongate hole
86 intermediate friction plate
86a, 86b end plate
86c connection plate
87 pressing plate
88 thrust bearing
89 nut
91, 92 hook portion
93 coil spring
95 coil spring
100 car body
101 steering wheel
102 intermediate shaft
103 steering gear
104 electric assist mechanism
105 tie-rod
300 clamp portion

What is claimed is:

1. A steering apparatus comprising:
    a steering shaft having conductivity and transferring a steering force;

an outer column having the conductivity, including a guide groove extending in an axial direction and receiving insertion of the steering shaft on a radially inner side;

an inner column having the conductivity, being fitted in the outer column to enable a relative movement in the axial direction, and supporting the steering shaft rotatably on the radially inner side;

a guide member being received in the guide groove and fitted to the inner column;

a fixture securing the guide member to the inner column;

an electrifying cover having the conductivity and covering at least part of the guide groove from a radially outer side of the outer column; and an electrifying plate having the conductivity, being fixed to the inner column in contact with at least one of the fixture and the inner column, and having at least a portion becoming elastically deformed to contact the electrifying cover under a predetermined contact pressure.

2. The steering apparatus according to claim 1, wherein the electrifying cover is formed separately from the outer column.

3. The steering apparatus according to claim 1, wherein the electrifying cover is formed integrally with the outer column, and the outer column has an opening penetrating the electrifying cover in the radial direction on a front side of a vehicle.

4. The steering apparatus according to claim 1, wherein the portion of the electrifying plate contacting the electrifying cover is a contact portion curved to be convex toward the electrifying cover.

5. The steering apparatus according to claim 4, wherein the contact portion is disposed on the guide member on a front side of a vehicle.

6. The steering apparatus according to claim 4, wherein the contact portion is disposed on the guide member on a rear side of a vehicle.

7. The steering apparatus according to claim 4, wherein the contact portion is disposed on the guide member on a front side of a vehicle, and the electrifying plate further has a second contact portion disposed on the guide member on a rear side of the vehicle and contacting the electrifying cover.

8. The steering apparatus according to claim 1, wherein the fixture includes a bolt, and the electrifying plate is equipped with an annulus ring receiving insertion of a screw shaft of the bolt.

9. The steering apparatus according to claim 1, wherein an inner peripheral surface of the outer column or an outer peripheral surface of the inner column is coated with a low friction material.

10. The steering apparatus according to claim 1, wherein the steering shaft is configured to include an upper steering shaft disposed on a rear side of a vehicle and a lower steering shaft disposed on a front side of the vehicle by fitting the upper steering shaft and the lower steering shaft together, and resin coating is applied over the upper steering shaft or the lower steering shaft at a fitting portion thereof.

11. A steering apparatus comprising:
a steering shaft having conductivity and transferring a steering force;

an outer column having the conductivity, including a guide groove extending in an axial direction and receiving insertion of the steering shaft on a radially inner side;

an inner column having the conductivity, being fitted in the outer column to enable a relative movement in the axial direction, and supporting the steering shaft rotatably on the radially inner side;

a guide member being received in the guide groove and fitted to the inner column;

a fixture securing the guide member to the inner column;

an electrifying cover having the conductivity and covering at least part of the guide groove from a radially outer side of the outer column; and an electrifying plate having the conductivity, being fixed to the inner column in contact with at least one of the fixture and the inner column, and having at least a portion becoming elastically deformed to contact the electrifying cover under a predetermined contact pressure, wherein the electrifying cover is formed separately from the outer column, and the portion of the electrifying plate contacting the electrifying cover is a contact portion curved to be convex toward the electrifying cover.

12. The steering apparatus according to claim 11, wherein the contact portion is disposed on the guide member on a front side of a vehicle.

13. The steering apparatus according to claim 11, wherein the contact portion is disposed on the guide member on a rear side of a vehicle.

14. The steering apparatus according to claim 11, wherein the contact portion is disposed on the guide member on a front side of a vehicle, and the electrifying plate further has a second contact portion disposed on the guide member on a rear side of the vehicle and contacting the electrifying cover.

15. The steering apparatus according to claim 11, wherein the fixture includes a bolt, and the electrifying plate is equipped with an annulus ring receiving insertion of a screw shaft of the bolt.

16. A steering apparatus comprising:
a steering shaft having conductivity and transferring a steering force;

an outer column having the conductivity, including a guide groove extending in an axial direction and receiving insertion of the steering shaft on a radially inner side;

an inner column having the conductivity, being fitted in the outer column to enable a relative movement in the axial direction, and supporting the steering shaft rotatably on the radially inner side;

a guide member being received in the guide groove and fitted to the inner column;

a fixture securing the guide member to the inner column;

an electrifying cover having the conductivity and covering at least part of the guide groove from a radially outer side of the outer column; and an electrifying plate having the conductivity, being fixed to the inner column in contact with at least one of the fixture and the inner column, and having at least a portion becoming elastically deformed to contact the electrifying cover under a predetermined contact pressure, wherein the electrifying cover is formed integrally with the outer column, the outer column has an opening penetrating the electrifying cover in the radial direction on a front side of a vehicle, and the portion of the electrifying plate contacting the electrifying cover is a contact portion curved to be convex toward the electrifying cover.

17. The steering apparatus according to claim 16, wherein the contact portion is disposed on the guide member on the front side of the vehicle.

18. The steering apparatus according to claim 16, wherein the contact portion is disposed on the guide member on a rear side of the vehicle.

19. The steering apparatus according to claim 16, wherein the contact portion is disposed on the guide member on the front side of the vehicle, and the electrifying plate further has a second contact portion disposed on the guide member on a rear side of the vehicle and contacting the electrifying cover.

20. The steering apparatus according to claim 16, wherein the fixture includes a bolt, and the electrifying plate is equipped with an annulus ring receiving insertion of a screw shaft of the bolt.

* * * * *